(12) United States Patent
Hoshina

(10) Patent No.: US 7,404,060 B2
(45) Date of Patent: Jul. 22, 2008

(54) APPARATUS, PROGRAM, AND METHOD FOR MANAGING USAGE OF MEMORY

(75) Inventor: Shoji Hoshina, Kawasaki (JP)

(73) Assignee: Seiko Epson Corporation, Tokyo (JP)

( * ) Notice: Subject to any disclaimer, the term of this patent is extended or adjusted under 35 U.S.C. 154(b) by 570 days.

(21) Appl. No.: 10/943,851

(22) Filed: Sep. 20, 2004

(65) Prior Publication Data

US 2005/0097297 A1 May 5, 2005

(30) Foreign Application Priority Data

Sep. 26, 2003 (JP) ............................. 2003-335490

(51) Int. Cl.
*G06F 12/00* (2006.01)
(52) U.S. Cl. .............. 711/170; 711/1; 711/2; 711/5; 711/173
(58) Field of Classification Search ............ 711/170
See application file for complete search history.

(56) References Cited

U.S. PATENT DOCUMENTS

| | | | |
|---|---|---|---|
| 5,454,096 A | * 9/1995 | Otsuka et al. | .................... 711/1 |
| 5,689,702 A | * 11/1997 | Bulusu | .................... 707/100 |
| 5,737,768 A | 4/1998 | Lloyd | |
| 6,058,460 A | 5/2000 | Nakhimovsky | |
| 6,505,275 B1 | 1/2003 | Weissman et al. | |
| 6,535,969 B1 | 3/2003 | Rawlings | |

FOREIGN PATENT DOCUMENTS

| | | |
|---|---|---|
| EP | 0 294 499 A1 | 12/1988 |
| EP | 0 817 044 A2 | 1/1998 |
| GB | 2 127 994 A | 4/1984 |
| GB | 2 388 448 A | 11/2003 |
| JP | 10056671 A * | 2/1998 |
| JP | A 2002-222117 | 8/2002 |
| WO | WO 00/05652 | 2/2000 |
| WO | WO 02/08908 A2 | 1/2002 |

OTHER PUBLICATIONS

Haggander D., et al., "Optimizing Dynamic Memory Management in a Multithreaded Application Executing on a Microprocessor," IEEE Aug. 10, 1998, pp. 262-269.

* cited by examiner

*Primary Examiner*—Matt Kim
*Assistant Examiner*—Hetul Patel
(74) *Attorney, Agent, or Firm*—Oliff & Berridge, PLC

(57) ABSTRACT

A memory management apparatus suitable for reducing amount of memory usage and simplifying programs is provided. When an area allocation request has been inputted, an unused area having a size that is determined by area size information included in the area allocation request is searched for as a candidate area on the basis of a memory management table 400. And overlap flag corresponding to an adjoining area that is contiguous with the candidate area in its lower address orientation is read from the memory management table 400, and, based on the overlap flag, it is determined whether or not the adjoining area is an area that allows overlapped allocation. If it is determined the area is an area allowing overlapped allocation, a used area that overlaps with the adjoining area is allocated.

13 Claims, 6 Drawing Sheets

| No. | Next Pointer | Prev Pointer | Status | Overlap Counter | Start Address | Size |
|---|---|---|---|---|---|---|
| 1 |  | × |  |  |  | × |
| 2 | × | × |  |  |  | × |
| 3 |  | × |  | . |  | × |
| 4 | × | × |  |  |  | × |
| : | × |  |  |  |  | × |
| : |  |  |  |  |  | × |

| OR(Overlap) | 2DA(2DAlign) | Vacancy | Pattern | |
|---|---|---|---|---|
| ○ | ○ | × |  | A |
| ○ | × | × |  | B |
| × | ○ | × |  | C |
| × | × | × |  | D |
| × | × | ○ |  | E |
| × | ○ | ○ |  | F |

420 422 424

*FIG. 6*
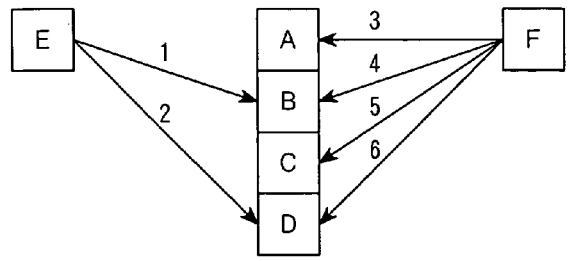
*FIG. 7A*  *FIG. 7B*  *FIG. 7C*  *FIG. 7D*
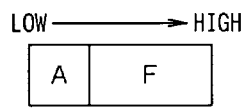 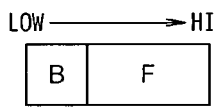 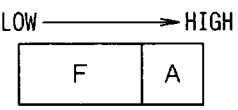 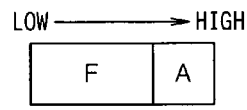
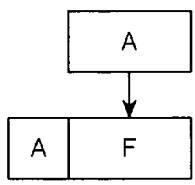 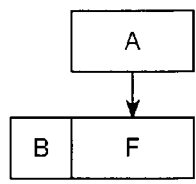 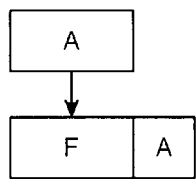 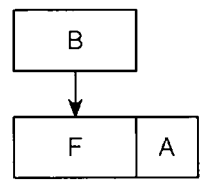
 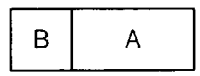 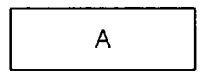 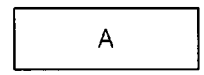
*FIG. 8*
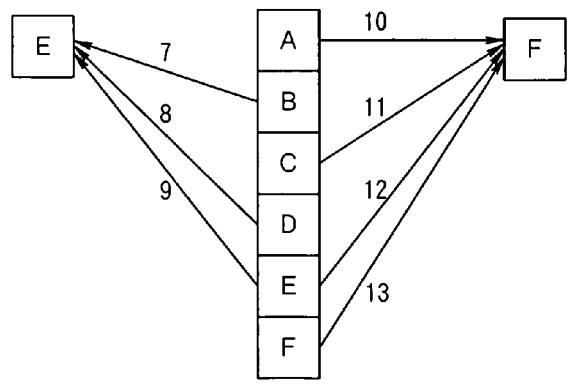

APPARATUS, PROGRAM, AND METHOD FOR MANAGING USAGE OF MEMORY

BACKGROUND OF THE INVENTION

1. Field of the Invention

The invention relates to a system, program, and method for managing usage of memory on the basis of a memory management table, and more specifically, to a memory management apparatus, program, and method suitable for reducing amount of memory usage and simplifying programs.

2. Description of the Related Art

A Real Time OS (Operating System) (hereinafter referred to as RTOS) performs a plurality of tasks in parallel. Typically, memory management capability of a microprocessor-based system in which a RTOS is implemented is realized as a feature of the RTOS. As well, memory allocation functions and memory freeing functions typified by malloc function and free function of C language are often implemented such that they wrap memory functions of a RTOS.

Each task running on a RTOS calls a memory allocation function to obtain memory area necessary for processing. The memory allocation functional locates necessary used area from available memory areas of memory on the basis of a memory management table, registers the start pointer to the allocated used area to the memory management table and passes it to the requesting task.

Techniques for reading to/writing from memory area as a virtual two-dimensional space include a memory usage method disclosed in Japanese Patent Laid-Open No. 2002-222117 (JP2002-222117A), for example.

The invention described in JP2002-222117A assumes a predefined two-dimensional memory space that arranges a virtual minimum two-dimensional memory space in the vertical and horizontal orientations, and allocates in advance each address of the virtual minimum two-dimensional memory space to each address of n physical memory blocks that are determined relative to the virtual minimum two-dimensional memory space. When reading data, a read address of the virtual minimum two-dimensional memory space is specified and also the vertical or horizontal direction of data reading is specified with the read address as the reference. Based on both of the specifications, contiguous data stored in the vertical or horizontal orientation of the virtual minimum two-dimensional memory space is read from each of the addresses corresponding to the n memory blocks.

In such a conventional RTOS as described above, if different tasks need to share data, the tasks may share the same used area. If different tasks use a memory area for distinct purposes, however, there has been a problem of amount of memory usage increasing since different used areas are to be allocated for each of the tasks.

In addition to the problem above, the invention described in JP2002-222117A has also a problem of a program becoming complex because, in order to allocate a used area as a two-dimensional memory space, a program on the task side has to calculate the maximum width of the two-dimensional memory space and request a required size from a memory allocation function.

Thus, the invention has been made in view of such unsolved problems of prior art, and has an object of providing a memory management apparatus, program, and method suitable for reducing amount of memory usage and simplifying programs.

SUMMARY OF THE INVENTION

After close examination, the inventors have found that even if different tasks use memory areas for distinct purposes, there will be no problem in processing if the memory areas are allocated overlapping with one another when the tasks do not use the memory areas simultaneously.

Invention 1: For attaining the object above, a memory management apparatus according to Invention 1, including used area allocation section for allocating a necessary used area from available memory areas of memory on the basis of a memory management table for managing the usage of the memory, and area management information registration section for registering area management information including access information for a used area allocated by the used area allocation section to the memory management table, characterized in that the area management information includes overlap information that indicates whether or not overlapped allocation of the memory area is allowed, and the used area allocation section searches for a used area that allows overlapped allocation from the memory areas based on the memory management table, and allocates the used area that overlaps with the located used area that allows overlapped allocation.

With such a configuration, since overlap information is registered in the memory management table, a used area that allows overlapped allocation is searched for from memory areas on the basis of the memory management table, and a used area that overlaps with a located used area that allows overlapped allocation is allocated by the used area allocation section. And area management information including access information for the allocated used area is registered to the memory management table by the area management information registration section.

This provides an advantage that amount of memory usage can be reduced as compared with conventional practices, because, if the different tasks do not use memory areas simultaneously, a used area will be allocated overlapping by allowing overlapped allocation by way of the overlap information for a memory area that is used by the other one of the tasks.

The memory includes semiconductor storage section such as RAM, as well as magnetically storing storage section such as FD and HD, optically reading storage section such as CD-R (Compact Disk-Recordable), magnetically storing/optically reading storage section such as MO, and any other storage section from which data can be read, whether electronically, magnetically, or optically. This also applies to the memory management program of Invention 9 and the memory management method of Invention 10.

Invention 2: The memory management apparatus according to Invention 1, characterized in that the used area allocation section includes candidate area searching section for, in response to an area allocation request including area size information that indicates a necessary size of the used area, searching for as a candidate area an area having a size that is determined by the area size information included in the area allocation request from among available memory areas of the memory on the basis of the memory management table;

adjoining area determination section for reading, from the memory management table, overlap information corresponding to an adjoining area that is in terms of address contiguous with the candidate area located by the candidate area searching section, and, based on the overlap information, determining whether or not the adjoining area is an area that allows overlapped allocation; and overlapping used area allocation section for, if the adjoining area determination section determines that the adjoining area allows overlapped allocation, allocating the used area that overlaps with the adjoining area.

With such a configuration, given an area allocation request including the area size information, an area that has a size determined by the area size information included in the area allocation request is searched for as a candidate area from among available memory areas of memory on the basis of the memory management table by the candidate area searching section. And overlap information corresponding to an adjoining area that is contiguous with the located candidate area in terms of address is read from the memory management table, and, based on the overlap information, it is determined whether or not the adjoining area is an area that allows overlapped allocation by the adjoining area determination section. If it is determined that the adjoining area allows overlapped allocation, a used area that overlaps with the adjoining area is allocated by the overlapping used area allocation section.

Thus, since a used area that overlaps with its adjoining area will be allocated, areas at consecutive addresses can be allocated as a used area. Therefore, an advantage is provided that access to the memory can be made efficiently.

Invention 3: the memory management apparatus according to Invention 2, characterized in that the area allocation request includes the overlap information, the used area allocation section further includes requested area determination section for determining whether or not a requested used area is an area that allows overlapped allocation on the basis of the overlap information included in the area allocation request; and non-overlapping used area allocation section for, if the requested area determination section determines that the requested area does not allow overlapped allocation, allocating the candidate area located by the candidate area searching section as the used area, and if both of the requested area determination section and the adjoining area determination section determine that the areas allow overlapped allocation, the overlapping used area allocation section allocates the used area that overlaps with the adjoining area.

With such a configuration, given an area allocation request including overlap information, it is determined whether or not the requested used area is an area that allows overlapped allocation on the basis of the overlap information included in the area allocation request by the requested area determination section. If it is determined that the requested used area does not allow overlapped allocation, the located candidate area is allocated as the used area by the non-overlapping used area allocation section. On the other hand, if it is determined that both the requested used area and the adjoining area allow overlapped allocation, a used area that overlaps with the adjoining area is allocated by the overlapping used area allocation section.

This enables areas explicitly indicating that overlapped allocation is allowed to be allocated such that they overlap with each other, thereby providing an advantage that possibility of access conflict among the tasks can be reduced.

Invention 4: the memory management apparatus according to Invention 3, characterized in that the area management information registration section registers to the memory management table area management information including access information for the used area allocated by the used area allocation section and overlap information that is included in the area allocation request.

With such a configuration, area management information including access information for the allocated used area and overlap information that is included in the area allocation request is registered to the memory management table by the area management information registration section.

This allows a program for tasks to allocate an overlapping used area just by providing an area allocation request including overlap information that indicates overlapped allocation is allowed. Thus, an advantage is provided that programs for tasks can be made relatively simple.

Invention 5: the memory management apparatus according to Invention 2, characterized in that the area allocation request includes multidimensional align information that indicates whether or not the memory area should be allocated as a virtual multidimensional space area, and the used area allocation section determines whether or not the requested used area is a virtual multidimensional space area on the basis of the multidimensional align information included in the area allocation request, and if it determines that the area is a virtual multidimensional space area, it allocates the used area as a multidimensional space memory area that takes into consideration the maximum spatial size of the virtual multidimensional space, and if it determines that the area is not a virtual multidimensional space area, it allocates the used area as a regular area.

With such a configuration, given an area allocation request including multidimensional align information, it is determined by the used area allocation section whether or not the requested used area is a virtual multidimensional space area based on the multidimensional align information included in the area allocation request. If it is determined that the requested area is a virtual multidimensional space area, a used area is allocated as a multidimensional space memory area that takes into consideration the maximum spatial size of the virtual multidimensional space. On the other hand, if it is determined that the requested used area is not a virtual multidimensional space area, a used area is allocated as a regular area.

This allows the program for the tasks to allocate a regular area as well as to allocate a multidimensional space memory area that takes into consideration the maximum spatial size of the virtual multidimensional space just by providing an area allocation request that includes multidimensional align information indicating that a memory area should be allocated as a virtual multidimensional space area without calculating the maximum spatial size of the virtual multidimensional space. Thus, an advantage is provided that the program for the tasks can be made relatively simple as compared to conventional programs.

Invention 6: the memory management apparatus according to Invention 5, characterized in that the area management information includes the multidimensional align information, the area allocation request includes the overlap information, the used area allocation section further includes first requested area determination section for determining whether or not the requested used area is an area that allows overlapped allocation on the basis of the overlap information included in the area allocation request;

second requested area determination section for determining whether or not the requested used area is a virtual multidimensional space area on the basis of the multidimensional align information included in the area allocation request; and second adjoining area determination section for reading the multidimensional align information corresponding to the adjoining area from the memory management table, and, based on the multidimensional align information, determining whether or not the adjoining area is a virtual multidimensional space area, and if both of the first requested area determination section and the adjoining area determination section determine that the areas allow overlapped allocation and both of the second requested area determination section and the second adjoining area determination section determine that the areas are virtual multidimensional space areas, the overlapping used area allocation section allocates the used area that overlaps with the adjoining area as the multidimensional space memory area.

With such a configuration, given the area allocation request including the overlap information and multidimensional align information, it is determined by the first requested area determination section whether or not the requested used area is an area that allows overlapped allocation on the basis of the overlap information included in the area allocation request. Also, it is determined by the second requested area determination section whether or not the requested used area is a virtual multidimensional space area on the basis of the multidimensional align information included in the area allocation request. Further, multidimensional align information corresponding to the adjoining area is read from the memory management table, and, based on the multidimensional align information, it is determined whether or not the adjoining area is a virtual multidimensional space area by the second adjoining area determination section. If both of the requested used area and the adjoining area are determined to be areas that allow overlapped allocation and to be virtual multidimensional space areas, a used area that overlaps with the adjoining area is allocated as a multidimensional space memory area by the overlapping used area allocation section.

This can provide an advantage of reduced possibilities of access conflicts occurring among the tasks and of improperly formatted used areas being used, since areas that explicitly indicate that overlapped allocation is allowed and that they should be allocated as virtual multidimensional space areas are overlapped with each other in allocation.

Invention 7: the memory management apparatus according to Invention 6, characterized in that the area management information registration section registers to the memory management table area management information that includes access information for the used area allocated by the used area allocation section as well as the multidimensional align information and overlap information included in the area allocation request.

With such a configuration, area management information that includes access information for the allocated used area as well as the multidimensional align information and overlap information included in the area allocation request is registered to the memory management table by the area management information registration section.

This enables a program for the tasks to allocate a multidimensional space memory area that takes into consideration the maximum spatial size of the virtual multidimensional space and to allocate an overlapping used area just by providing an area allocation request including multidimensional align information indicating that a memory area should be allocated as a virtual multidimensional space area as well as overlap information indicating that overlapped allocation is allowed. Therefore, there is an advantage that the programs for tasks can be further simplified.

Invention 8: the memory management apparatus according to any of the Inventions 2 to 7, characterized in that the area management information includes a overlap counter that indicates the number of overlaps among the memory areas, the area management information registration section reads from the memory management table the overlap counter corresponding to the adjoining area and the overlap counter corresponding to the used area allocated by the overlapping used area allocation section, compares the overlap counters, and increments the one having a larger value, the memory management apparatus further includes used area freeing section for freeing the used area as an available memory area, the used area freeing section includes to-be-freed area searching section for, in response to an area freeing request, searching for a used area that is appropriate to the area freeing request as an area to be freed from among used areas of the memory on the basis of the memory management table, and overlapping area freeing section for decrementing the overlap counter corresponding to the area to be freed that is located by the to-be-freed area searching section, and, when the value of the overlap counter reaches a predetermined value, freeing the to-be-freed area as an available memory area.

With such a configuration, in the case of used area allocating, the overlap counter corresponding to the adjoining area and the overlap counter corresponding to the allocated used area are read from the memory management table, those overlap counters are compared and the one having a greater value is incremented by the area management information registration section.

In the case of memory area freeing, given an area freeing request, a used area appropriate to the area freeing request is searched for as an area to be freed from among used areas of the memory based on the memory management table by the to-be-freed area searching section. And the overlap counter corresponding to the located area for freeing is decremented, and, when the value of the overlap counter reaches a predetermined value, the area is freed as an available memory area by the overlapping area freeing section.

This provides an advantage that overlapping and allocating used areas can be freed without giving affect on one another.

Invention 9: For attaining the object above, a memory management program for causing a computer to execute processes that are realized as used area allocation section for allocating a necessary used area from among available memory areas of memory on the basis of a memory management table for managing the usage of the memory and area management information registration section for registering to the memory management table area management information including access information for the used area allocated by the used area allocation section, characterized in that the area management information includes overlap information that indicates whether or not overlapped allocation of the memory area is allowed, and the used area allocation section searches for a used area that allows overlapped allocation from the memory areas on the basis of the memory management table, and allocates the used area that overlaps with the located used area that allows overlapped allocation.

With such a configuration, a computer reads the program and executes processing in accordance with the program so that operation and effects equivalent to the memory management apparatus of Invention 1 can be obtained.

Invention 10: For attaining the object above, a memory management method, including the steps of:

a used area allocation step of allocating a necessary used area from available memory areas of memory on the basis of a memory management table managing the usage of the memory; and an area management information registration step of registering to the memory management table area management information including access information for the used area allocated at the used area allocation step, characterized in that the area management information includes overlap information that indicates whether or not overlapped allocation of the memory area is allowed, and the used area allocation step searches for a used area that allows overlapped allocation from among the memory areas based on the memory management table, and allocates the used area that overlaps with the located used area that allows overlapped allocation.

This provides effects equivalent to the memory management apparatus of Invention 1.

BRIEF DESCRIPTION OF THE DRAWINGS

FIG. 3 shows a data structure of a memory management table 400;

FIG. 4 shows a data structure of a field 408;

FIG. 6 illustrates state transition of a memory area in allocation of a used area;

FIGS. 7A to 7D illustrate overlapped allocation of a memory area;

FIG. 8 illustrates state transition of a memory area in freeing a used area;

DETAILED DESCRIPTION OF THE PREFERRED EMBODIMENTS

Figure 1:
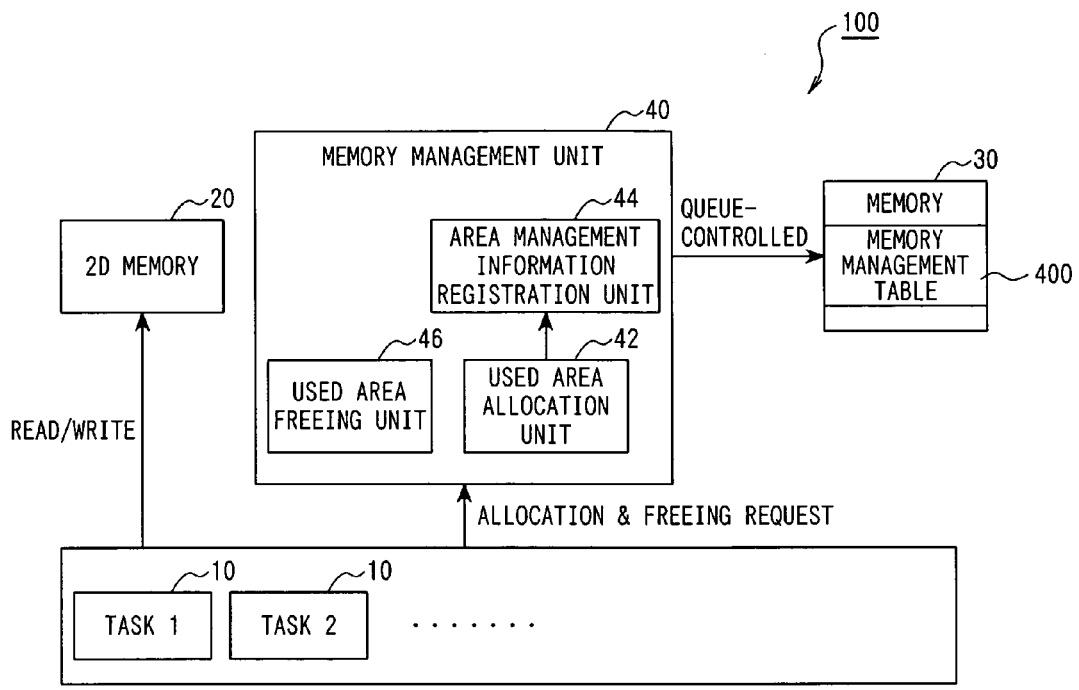
FIG. 1 is a functional block diagram illustrating a configuration of a memory management apparatus 100.
Figure 10:
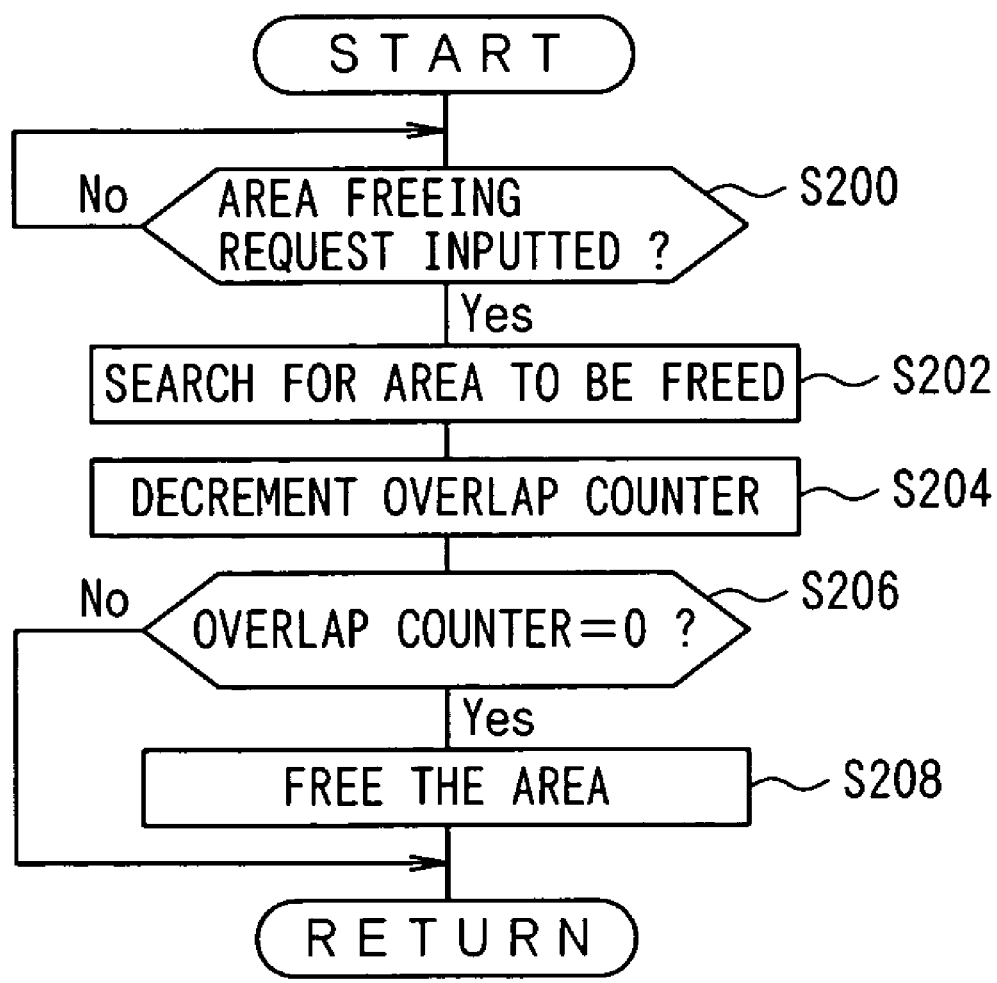
FIG. 10 is a flowchart illustrating the process of freeing a used area.

Now, an embodiment of the invention will be described with reference to the drawings. FIGS. 1 and 10 illustrate an embodiment of the memory management apparatus, program, and method of the invention.

The embodiment applies the memory management apparatus, program, and method of the invention to a case where the usage of two-dimensional memory 20 is managed on the basis of a memory management table 400, as shown in FIG. 1.

The configuration of a memory management apparatus 100 to which the invention is applied will be first described with reference to FIG. 1.

FIG. 1 is a functional block diagram showing a configuration of the memory management apparatus 100.

As shown in the figure, the memory management apparatus 100 includes a plurality of tasks 10 that can be executed in parallel, two-dimensional memory 20, memory 30 in which a memory management table 400 is stored, and a memory management unit 40 that manages the usage of the two-dimensional memory 20 on the basis of the memory management table 400.

The structure of the two-dimensional memory 20 will be next described in detail with reference to FIG. 2.

Figure 2:
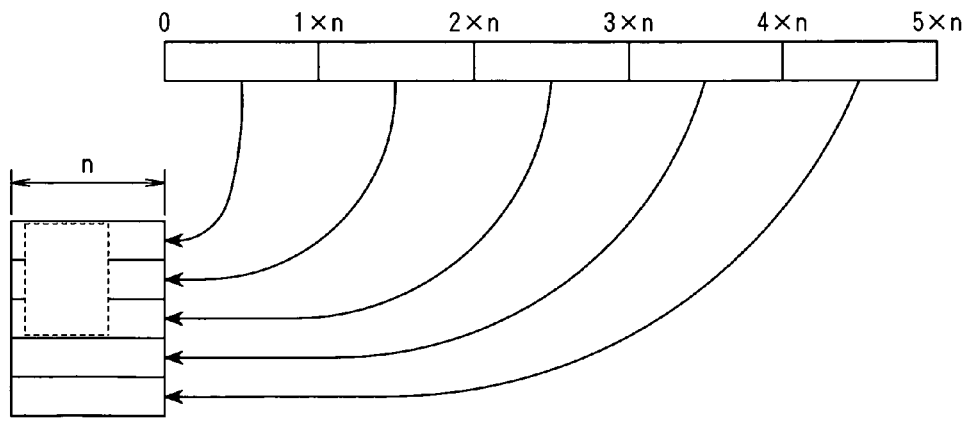
FIG. 2 shows a structure of a two-dimensional memory 20.

FIG. 2 shows a structure of the two-dimensional memory 20.

As shown in the figure, the two-dimensional memory 20 has a virtual two-dimensional space memory area of n bytes wide and m bytes long. When reading data, an address to be read in the virtual minimum two-dimensional memory space is specified, and the horizontal or vertical direction of data reading is specified relative to the specified read address. Based on both of the specifications, contiguous data arranged in the vertical or horizontal orientation of the virtual minimum two-dimensional memory space is read from each of the addresses to which the n memory blocks correspond.

The two-dimensional memory 20 may be any known memory, and its more specific structure is described in JP2002-222117A, for example.

The structure of the memory management table 400 will be now described in detail with reference to FIGS. 3 and 5.

FIG. 3 shows a data structure of the memory management table 400.

The memory management table 400 is a queue-based list that registers the most recent record to the tail, registering area management information as one record for each used area or each unused area. Here, a used area means a memory area that is allocated for any of the tasks 10 and an unused area means a memory area that is not allocated for any of the tasks 10.

As shown in FIG. 3, each record includes a field 402 for registering a record number (No.), a field 404 for registering a record number corresponding to the posterior used area (Next pointer) when a plurality of discontinuous used areas at addresses of the two-dimensional memory 20 are employed as one used area, and a field 406 for registering a record number corresponding to the anterior used area (Prev pointer) when a plurality of discontinuous used areas at addresses of the two-dimensional memory 20 are employed as one used area. Each record also includes a field 408 for registering status information for a used or unused area (Status), field 410 for registering a overlap counter indicating the number of overlaps of a memory area (Overlap Counter), a field 412 for registering a start pointer to a used or unused area (Start Address), and a field 414 for registering the size of a used or unused area (Size).

FIG. 4 shows the data structure of the field 408.

As shown in the figure, the field 408 includes a field 420 for registering a overlap flag indicating whether or not overlapped allocation of the memory area is allowed (Overlap), a field 422 for registering 2D align flag indicating whether or not a memory area is to be allocated as a virtual two-dimensional space area (2DAlign), and a field 424 for registering usage flag indicating the memory area is either a used area or unused area (Vacancy).

A memory area can assume six states as shown in FIG. 4. Designating each of the states by A to F, state A indicates that overlapped allocation of the memory area by the plurality of tasks 10 is allowed, a used area can be allocated as an area that takes into consideration the maximum width of the two-dimensional memory space (hereinafter referred to as 2D area), and that the memory area is a used area currently allocated for any of the tasks 10. State B indicates that overlapped allocation of the memory area by the plurality of tasks 10 is allowed, that a used area can be allocated as a regular area, and that the memory area is a used area currently allocated for any of the tasks 10.

State C indicates that overlapped allocation of the memory area by the plurality of tasks 10 is not allowed, a used area can be allocated as a 2D area, and the memory area is a used area currently allocated for any of the tasks 10. State D indicates that overlapped allocation of the memory area by the plurality of tasks 10 is not allowed, a used area can be allocated as a regular area, and the memory area is a used area currently allocated for any of the tasks 10.

State E indicates that overlapped allocation of the memory area by the plurality of tasks 10 is not allowed, a used area can be allocated as a 2D area, and the memory area is an unused area currently not allocated for any of the tasks 10. State F indicates that overlapped allocation of the memory area by the plurality of tasks 10 is not allowed, a used area can be allocated as a regular area, and the memory area is an unused area currently not allocated for any of the tasks 10.

In its initial state, the memory management table 400 registers only one piece of area management information for an unused area of state F.

Figure 5:
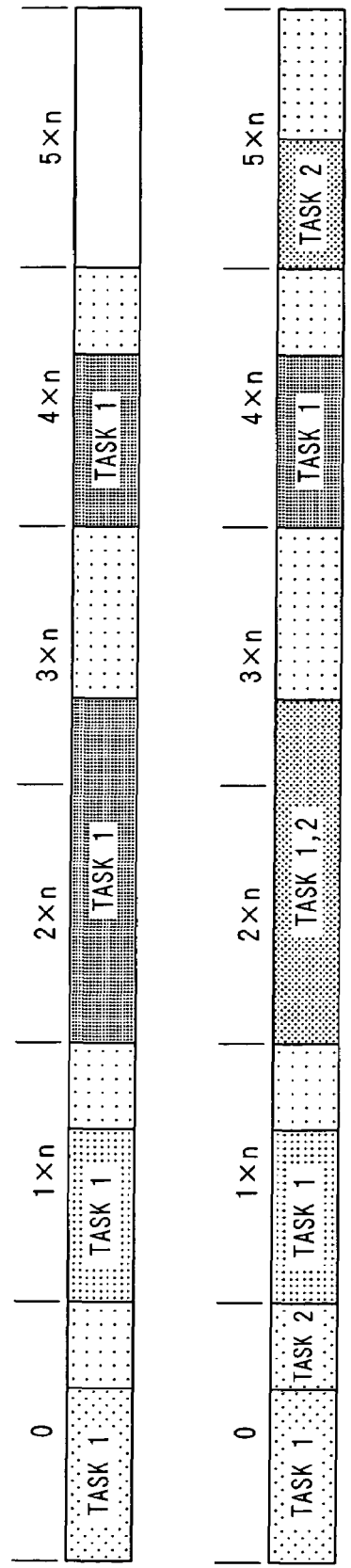
FIG. 5 shows a usage of the two-dimensional memory 20.

FIG. 5 shows the usage state of the two-dimensional memory 20.

Since the two-dimensional memory 20 enables contiguous data to be read from addresses corresponding to each of the n memory blocks, used areas will be allocated such that their start addresses are integral multiples of n, as shown in FIG.

In the example of FIG. 5, the memory area starting at address zero in the upper section is in state D. It means that overlapped allocation of the memory area by the plurality of tasks 10 is not allowed, a used area can be allocated as a regular area, and the memory area is a used area currently allocated for task 1. As well, the memory area starting at address 2n in the lower section is in state B. It means that overlapped allocation of the memory area by the plurality of tasks 10 is allowed, a used area can be allocated as a regular area, and the memory area is a used area currently allocated for tasks 1 and 2.

Next, the configuration of the memory management unit 40 will be described in detail with reference to FIGS. 1, 6, and 7A to 7D.

As shown in FIG. 1, the memory management unit 40 includes a used area allocation unit 42 for allocating a required used area from among available memory areas in the two-dimensional memory 20 on the basis of the memory management table 400, a area management information registration unit 44 for registering area management information for used areas allocated by the used area allocation unit 42 into the memory management table 400, and a used area freeing unit 46 for freeing a used area as an available memory area.

When a request for area allocation is inputted that includes area size information indicating a necessary size of a used area, overlap flag, and 2D align flag, the used area allocation unit 42 allocates a used area required by the tasks 10 from among available memory areas of the two-dimensional memory 20 based on the area size information, overlap flag, and 2D align flag included in the area allocation request.

FIG. 6 illustrates state transition of a memory area in the case a used area is allocated.

The used area allocation unit 42 allocates a used area by updating the memory management table 400 to change a memory area in state E or F into any of states A, B, C, or D. In FIG. 6, a memory area in state E transitions to state B or D. That is, an unused area that can be allocated as a regular area may be used as a regular area that allows overlapped allocation is or may be used as a regular area that does not allows overlapped allocation. A memory area in state F transitions to any of states A, B, C, or D. That is, an unused area that can be allocated as a 2D area may be used as a 2D area or regular area that allows overlapped allocation or may be used as a 2D area or regular area that does not allow overlapped allocation.

FIGS. 7A to 7D show overlapped allocation of a memory area.

The used area allocation unit 42 searches for as a candidate area an unused area having a size that is determined by the area size information included in an area allocation request on the basis of the memory management table 400, and, based on the state of the adjoining area that is contiguous to the located candidate area in the lower address orientation, allocates a used area that overlaps with the adjoining area.

In the example of FIG. 7A, a used area in state A is contiguous with an unused area in state F in its lower address orientation. When the tasks 10 have requested that a used area in state A be allocated, if an unused area in state F is located as a candidate area, the used area is allocated that overlaps with the adjoining area.

In the example of FIG. 7B, a used area in state B is contiguous with an unused area in state F in its lower address orientation. When the tasks 10 have requested that a used area in state A be allocated, if an unused area in state F is located as a candidate area, the used area is allocated without overlapping with the adjoining area.

In the example of FIG. 7C, a used area in state A is contiguous with an unused area in state F in its upper address orientation. When the tasks 10 have requested that a used area in state A be allocated, if an unused area in state F is located as a candidate area, the used area is allocated as a single used area in state A by combining the candidate area and the adjoining area.

In the example of FIG. 7D, a used area in state A is contiguous with an unused area in state F in its upper address orientation. When the tasks 10 have requested that a used area in state B be allocated, if an unused area in state F is located as a candidate area, the used area is allocated as a single used area in state A by combining the candidate area and the adjoining area.

When a request for area freeing is inputted, the used area freeing unit 46 searches for the used area appropriate to the area freeing request from used areas of the two-dimensional memory 20 as a area to be freed, and frees the located area as an available memory area. It also frees an unused area as other formats of unused area.

FIG. 8 illustrates state transition of a memory area in freeing a used area.

The used area freeing unit 46 allocates a used area by updating the memory management table 400 to change a memory area in state A, B, C, D, E, or F into state E or F. In FIG. 8, a memory area in state A, C, or F transitions to state F. That is, a used area that has been allocated as a 2D area or an unused area that can be allocated as a 2D area may be freed as an unused area that can be allocated as a 2D area. Also, a memory area in state B or D transitions to state E. That is, a used area that has been allocated as a regular area can be freed as an unused area that can be allocated as a regular area. State E transitions to state E or F. That is, an unused area that can be allocated as a regular area may be freed as an unused area that can be allocated as a 2D area or regular area.

The memory management unit 40 has the same functions as a general computer that connects a CPU, ROM, RAM, and I/F and the like by bus. The CPU activates a predetermined program stored in a predetermined area of ROM, and, in accordance with the program, executes each of the processes of allocating and freeing a used area shown in the flowcharts of FIGS. 9 and 10 in a time-sharing scheme.

The process of used area allocation will be first described in detail with reference to FIG. 9.

Figure 9:
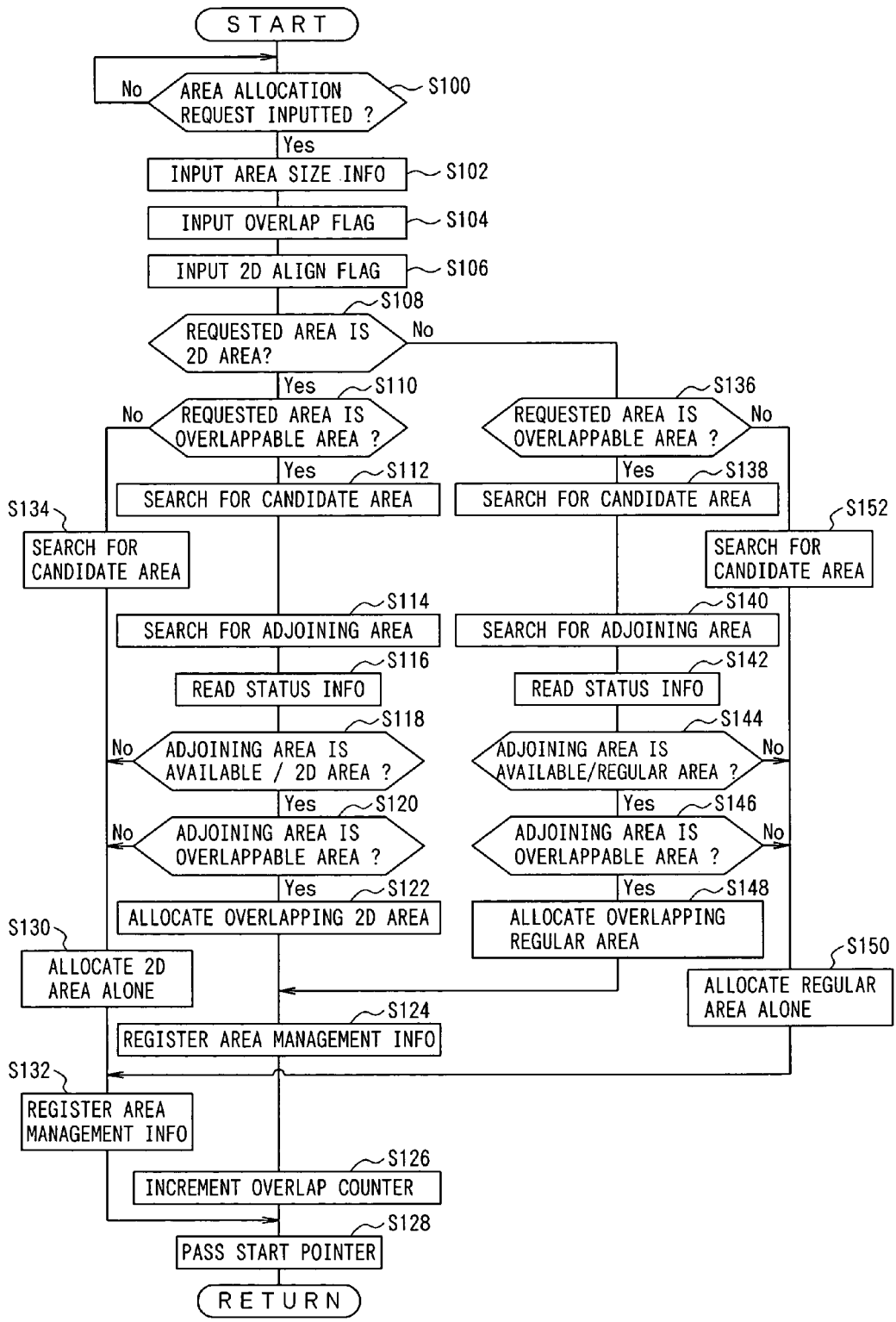
FIG. 9 is a flowchart illustrating the process of allocating a used area.

FIG. 9 is a flowchart illustrating the process of used area allocation.

This process is a process that is realized as the used area allocation unit 42 and area management information registration unit 44, and when executed by the CPU, it first proceeds to step S100 as shown in FIG. 9.

At step S100, it is determined whether an area allocation request has been inputted. If it is determined that an area allocation request has been inputted (Yes), the process proceeds to step S102, otherwise (No), it waits at step S100 until an area allocation request is inputted.

At step S102, area size information is inputted as an argument, then, at step S104, the overlap flag is inputted as an argument. The process then proceeds to step S106, where 2D align flag is inputted as an argument, and the process proceeds to step S108.

At step S108, based on the 2D align flag inputted as an argument, it is determined whether or not the used area requested by the task 10 (hereinafter referred to as requested area) is a 2D area. If it is determined that the requested area is a 2D area (Yes), the process proceeds to step S110.

At step S110, based on the overlap flag inputted as an argument, it is determined whether or not the requested area is an area for which overlapped allocation is allowed. If it is determined the area is an area for which overlapped allocation is allowed (Yes), the process proceeds to step S112.

At step S112, based on the memory management table 400, an unused area (state F) that has a size greater than the size that is determined by the area size information inputted as an argument is searched for as a candidate area from available memory areas in the two-dimensional memory 20, and the located candidate area is divided to get an area of a necessary size. The process then proceeds to step S114.

At step S114, based on the memory management table 400, an adjoining area that is contiguous with the area of the reduced size in the lower address orientation is searched for, and, then at step S116, status information corresponding to the located adjoining area is read from the memory management table 400, and the process proceeds to step S118.

At step S118, based on the 2D align flag and usage state flag included in the status information, it is determined whether or not the adjoining area is a 2D area or an unused area (state F), and if the area is determined to be a 2D area or an unused area (Yes), the process proceeds to step S120.

At step S120, based on the overlap flag included in the status information, it is determined whether or not the adjoining area is an area for which overlapped allocation is allowed, and if the area is determined to be an area for which overlapped allocation is allowed (Yes), the process proceeds to step S122.

At step S122, a used area overlapping with the adjoining area is allocated as a 2D area, and then at step S124, the area management information including the overlap flag and 2D align flag that have been inputted as arguments is registered in the memory management table 400. The process then proceeds to step S126.

At step S126, the overlap counter corresponding to the adjoining area and the overlap counter corresponding to the allocated used area are read from the memory management table 400, the two overlap counters are compared, and the one having a greater value is incremented by one. Then, at step S128, the start pointer to the allocated used area is passed to the requesting tasks 10, and the whole process is completed and the processing that was originally taking place is restored.

Meanwhile, if the adjoining area is determined not to be an area that allows overlapped allocation (No) at step S120, the process proceeds to step S130, where the candidate area of the reduced size is allocated as a used area of 2D area without overlapping with the adjoining area. Then, at step S132, the area management information including the overlap flag and 2D align flag that have been inputted as arguments is registered in the memory management table 400, and the process proceeds to step S128.

Meanwhile, if the adjoining area is determined not to be a 2D area or unused area (No) at step S118, the process proceeds to step S130.

Meanwhile, if the requested area is determined not be an area that allows overlapped allocation (No) at step S110, the process proceeds to step S134, where, based on the memory management table 400, an unused area (state F) that has a size greater than the size determined by the area size information inputted as an argument is searched for as a candidate area from available memory areas in the two-dimensional memory 20, and the located candidate area is divided to get a necessary size. The process then proceeds to step S130.

Meanwhile, if the requested area is determined not to be a 2D area (No) at step S108, the process proceeds to step S136.

At step S136, based on the overlap flag inputted as an argument, it is determined whether or not the requested area is an area that allows overlapped allocation, and if the area is an area that allows overlapped allocation (Yes), the process proceeds to step S138.

At step S138, based on the memory management table 400, an unused area (state E or F) that has a size greater than the size determined by the area size information inputted as an argument is searched for as a candidate area from available memory areas of the two-dimensional memory 20, and the located candidate area is divided to get an area of a necessary size. The process then proceeds to step S140.

At step S140, based on the memory management table 400, an adjoining area that is contiguous with the divided candidate area in its lower address orientation is searched for, and, at step S142, status information corresponding to the located adjoining area is read from the memory management table 400, and the process proceeds to step S144.

At step S144, based on the 2D align flag and usage state flag included in the status information, it is determined whether or not the adjoining area is a regular area or unused area (state E or F), and if the area is determined to be either a regular area or unused area (Yes), the process proceeds to step S146.

At step S146, based on the overlap flag included in the status information, it is determined whether or not the adjoining area is an area for which overlapped allocation is allowed. If the area is determined to be an area that allows overlapped allocation (Yes), the process proceeds to step S148.

At step S148, a used area overlapping with the adjoining area is allocated as a regular area, and the process proceeds to step S124.

Meanwhile, if it is determined that the adjoining area is not an area that allows overlapped allocation (No) at step S146, the process proceeds to step S150, where the candidate area of the reduced size that does not overlap with the adjoining area is allocated as a used area of regular area, and the process proceeds to step S132.

Meanwhile, if it is determined that the adjoining area is not a regular area or an unused area (No) at step S144, the process proceeds to step S150.

Meanwhile, if it is determined that the requested area is not an area that allows overlapped allocation (No) at step S136, the process proceeds to step S152, where, based on the memory management table 400, an unused area (state E or F) having a size greater than the size determined by the area size information inputted as an argument is searched for as a candidate area from available memory areas of the two-dimensional memory 20, and the located candidate area is divided to get an area of a necessary size. The process then proceeds to step S150.

The process of freeing a used area will be now described in detail with reference to FIG. 10.

FIG. 10 is a flowchart illustrating the used area freeing process.

This process is a process realized as the used area freeing unit 46, and when executed by the CPU, it first proceeds to step S200 as shown in FIG. 10.

At step S200, it is determined whether or not an area freeing request has been inputted. If it is determined that the request has been inputted (Yes), the process proceeds to step S202, otherwise (No), it waits at step S200 until the request is inputted.

At step S202, based on the memory management table 400, a used area appropriate to the area freeing request is searched for as an area to be freed from among used areas of the two-dimensional memory 20. And then at step S204, the overlap counter corresponding to the area to be freed is decremented by one, and the process proceeds to step S206.

At step S206, it is determined whether or not the value of the overlap counter is zero, and if it is determined the value is zero (Yes), the process proceeds to step S208, where the area to be freed is freed as an available memory area, the whole process is completed and the processing that was originally taking place is restored.

Meanwhile, if it is determined the value of the overlap counter is not zero (No) at step S206, the whole process is completed and the original processing is restored.

In the following, the operation of the embodiment will be described.

The description will first discuss a case where the tasks 10 allocate a used area in state A.

When a used area in state A is to be allocated, the program for the tasks 10 outputs an area allocation request to the memory management unit 40 that includes 2D align flag indicating that a memory area should be allocated as a 2D area, overlap flag indicating that overlapped allocation is allowed, and area size information.

Upon input of the area allocation request, the memory management unit 40 determines whether or not the requested area is a 2D area based on the 2D align flag included in the area allocation request via step S108. Here, since the tasks 10 request allocation of a used area in state A, it is determined the requested area is a 2D area.

Then, via step S110, it is determined whether or not the requested area is an area that allows overlapped allocation on the basis of the overlap flag included in the area allocation request. Here, since the tasks 10 request allocation of a used area in state A, it is determined that the requested area is an area that allows overlapped allocation.

Then, via step S112, based on the memory management table 400, an unused area that is of a size determined by the area size information included in the area allocation request is searched for as a candidate area. When a candidate area is located, based on the memory management table 400, an adjoining area that is contiguous with the candidate area in its lower address orientation is searched for via step S114. When the adjoining area is located, status information corresponding to the adjoining area is read from the memory management table 400 via step S116.

Then, via steps S118 and S120, based on the status information, it is determined whether or not the adjoining area is a 2D area or unused area as well as whether or not the adjoining area is an area that allows overlapped allocation.

If the adjoining area is in state A or F, it is determined at determination at steps S118 and S120 that the adjoining area is either a 2D area or unused area and is an area that allows overlapped allocation, so that a used area overlapping with the adjoining area is allocated as a 2D area via step S122.

Then, via steps S124 to S128, area management information for the allocated used area is registered to the memory management table 400, a larger one of the overlap counter corresponding to the adjoining area and the overlap counter corresponding to the allocated used area is incremented by one, and the start pointer to the allocated used area is passed to the requesting tasks 10.

Meanwhile, in the case the adjoining area is in state C, it is determined at steps S118 and S120 that the adjoining area is a 2D area and is an area that does not allow overlapped allocation, so that the candidate area without overlapping with the adjoining area is allocated as a used area of 2D area via step S130.

And via steps S132 and S128, area management information for the allocated used area is registered to the memory management table 400, and the start pointer to the allocated used area is passed to the requesting tasks 10.

Meanwhile, in the case the adjoining area is in state B, D, or E, it is determined at step S118 that the adjoining area is not a 2D area or unused area, so that the candidate area is allocated as a used area of 2D area without overlapping with the adjoining area via step S130.

Then, via steps S132 and S128, area management information for the allocated used area is registered to the memory management table 400, and the start pointer to the allocated used area is passed to the requesting tasks 10.

Next, a case where the tasks 10 allocate a used area in state B will be described.

When a used area in state B is to be allocated, the program for the tasks 10 outputs an area allocation request to the memory management unit 40 that includes 2D align flag indicating that a memory area should be allocated as a regular area, overlap flag indicating that overlapped allocation is allowed, and area size information.

Upon input of the area allocation request, the memory management unit 40 determines whether or not the requested area is a 2D area based on the 2D align flag included in the area allocation request via step S108. Here, since the tasks 10 request allocation of a used area in state B, it is determined the requested area is not a 2D area.

Then, via step S136, based on the overlap flag included in the area allocation request, it is determined whether or not the requested area is an area that allows overlapped allocation. Here, since the tasks 10 request allocation of a used area in state B, it is determined that the requested area is an area that allows overlapped allocation.

Then, via step S138, based on the memory management table 400, an unused area of a size that is determined by the area size information included in the area allocation request is searched for as a candidate area. When a candidate area is located, based on the memory management table 400, an adjoining area that is contiguous with the candidate area in its lower address orientation is searched for via step S140. When the adjoining area is located, status information corresponding to the adjoining area is read from the memory management table 400 via step S142.

Then, via steps S144 and S146, it is determined whether or not the adjoining area is a regular area or an unused area as well as whether or not the area is an area that allows overlapped allocation, on the basis of the status information.

In the case the adjoining area is in state B, E, or F, it is determined at steps S144 and S146 that the adjoining area is either a regular area or unused area and is an area that allows overlapped allocation, so that the used area overlapping with the adjoining area is allocated as a regular area via step S148.

Then, via steps S124 to S128, area management information for the allocated used area is registered to the memory management table 400, the larger one of the overlap counter corresponding to the adjoining area and the overlap counter corresponding to the allocated used area is incremented by one, and the start pointer to the allocated used area is passed to the requesting tasks 10.

Meanwhile, in the case the adjoining area is in state D, it is determined at steps S144 and S146 that the adjoining area is a regular area and is an area that does not allow overlapped allocation, so that the candidate area without overlapping with the adjoining area is allocated as a used area of regular area via step S150.

Then, via steps S132 and S128, the area management information for the allocated used area is registered to the memory management table 400, and the start pointer to the allocated used area is passed to the requesting tasks 10.

Meanwhile, in the case the adjoining area is in state A or C, it is determined at step S144 that the adjoining area is not a regular area, so that the candidate area without overlapping with the adjoining area is allocated as a used area of regular area via step S150.

Then, via steps S132 and S128, area management information for the allocated used area is registered to the memory management table 400, and the start pointer to the allocated used area is passed to the requesting tasks 10.

Next, a case where the tasks 10 allocate a used area in state C will be described.

When a used area in state C is to be allocated, the program for the tasks 10 outputs an area allocation request to the memory management unit 40 that includes 2D align flag indicating a memory area should be allocated as a 2D area, overlap flag indicating that overlapped allocation is not allowed, and area size information.

Upon input of the area allocation request, the memory management unit 40 determines whether or not the requested area is a 2D area based on the 2D align flag included in the area allocation request via step S108. Here, since the tasks 10 request allocation of a used area in state C, it is determined that the requested area is a 2D area.

Then, via step S110, based on the overlap flag included in the area allocation request, it is determined whether or not the requested area is an area that allows overlapped allocation. Here, since the tasks 10 request allocation of a used area in state C, it is determined that the requested area is not an area allowing overlapped allocation.

Then, via step S134, based on the memory management table 400, an unused area of a size that is determined by the area size information included in the area allocation request is searched for as a candidate area. When a candidate area is located, the candidate area is allocated as a used area of 2D area without overlapping with the adjoining area via step S130.

Then, via steps S132 and S128, area management information for the allocated used area is registered to the memory management table 400, and the start pointer to the allocated used area is passed to the requesting tasks 10.

Next, a case the tasks 10 allocate a used area in state D will be described.

When a used area in state D is to be allocated, the program for the tasks 10 outputs an area allocation request to the memory management unit 40 that includes 2D align flag indicating a memory area should be allocated as a regular area, overlap flag indicating that overlapped allocation is not allowed, and area size information.

Upon input of the area allocation request, the memory management unit 40 determines whether or not the requested area is a 2D area based on the 2D align flag included in the area allocation request via step S108. Here, since the tasks 10 request allocation of a used area instate D, it is determined the requested area is not a 2D area.

Then, via step S136, based on the overlap flag included in the area allocation request, it is determined whether or not the requested area is an area that allows overlapped allocation. Here, since the tasks 10 request allocation of a used area in state D, it is determined that the requested area is not an area allowing overlapped allocation.

Then, via step S152, based on the memory management table 400, an unused area of a size that is determined by the area size information included in the area allocation request is searched for as a candidate area. When a candidate area is located, the candidate area without overlapping with the adjoining area is allocated as a used area of regular area via step S150.

Then, via steps S132 and S128, area management information for the allocated used area is registered to the memory management table 400, and the start pointer to the allocated used area is passed to the requesting tasks 10.

Now, how the tasks 10 employ a used area will be described.

If the allocated used area is one that does not overlap with an adjoining area, it is employed without specific synchronization among the plurality of tasks 10. On the other hand, if the allocated used area is an area that overlaps with an adjoining area, a semaphore should be obtained before using the area.

In the following, freeing of an overlapping and allocating used area will be described.

When an overlapping and allocating used area is to be freed, the program for the tasks 10 outputs an area freeing request to the memory management unit 40.

Upon input of the area freeing request, the memory management unit 40 searches for a used area appropriate to the area freeing request as an area to be freed based on the memory management table 400 via step S202. When the area to be freed is located, the overlap counter corresponding to the area is decremented by one via step S204.

When the value of the overlap counter becomes zero after decrement, the area will be freed as an available memory area via step S208. At this point, if the adjoining area is an unused area, the area to be freed and the adjoining area are combined into one unused area.

When the value of the overlap counter is greater than zero after decrement, the area to be freed should not be freed because it may possibly be used by any other tasks 10.

As has been described, the embodiment searches for as a candidate area an unused area of a size that is determined by the area size information included in an area allocation request based on the memory management table 400, reads the overlap flag corresponding to the adjoining area that is contiguous with the candidate area in its lower address orientation from the memory management table 400, determines whether or not the adjoining area is an area that allows overlapped allocation on the basis of the overlap flag, and, if it is determined that the area allows overlapped allocation, allocates a used area that overlaps with the adjoining area.

This can reduce usage amount of the two-dimensional memory 20 as compared with conventional practices, because, if the different tasks 10 do not use memory areas simultaneously, a used area that overlaps with an adjoining area will be allocated by allowing overlapped allocation utilizing the overlap flag for a memory area used by the other one of the tasks 10.

In addition, since a used area that overlaps with its adjoining area will be allocated, areas at consecutive addresses can be allocated as a used area. Therefore, access to the two-dimensional memory 20 can be made efficiently.

Moreover, the embodiment determines whether or not a requested area is an area that allows overlapped allocation on the basis of the overlap flag included in the area allocation request. If it determines that both the requested area and its adjoining area are areas that allow overlapped allocation, the embodiment allocates a used area overlapping with the adjoining area, and if they are not areas that allow overlapped allocation, it allocates a candidate area as a used area.

This enables areas explicitly indicating that overlapped allocation is allowed to be allocated such that they overlap with each other, thereby reducing the possibility of access conflict among the tasks 10.

Moreover, the embodiment determines whether or not the requested area is a 2D area on the basis of the 2D align flag included in the area allocation request. If it determines that the area is a 2D area, it allocates a used area as a 2D area, and if the area is not a 2D area, it allocates a used area as a regular area.

This allows the program for the tasks 10 to allocate a regular area and also to allocate a 2D area just by providing an area allocation request that includes a 2D align flag indicating that the memory area should be allocated as a 2D area without calculating the maximum width of the two-dimensional memory space. Thus, the program for the tasks 10 can be made relatively simple as compared to conventional programs.

Moreover, the embodiment determines whether or not the requested area is an area that allows overlapped allocation based on the overlap flag included in the area allocation request and whether or not the requested area is a 2D area based on the 2D align flag included in the area allocation request. And it reads the 2D align flag corresponding to the adjoining area from the memory management table 400, and determines whether or not the adjoining area is a 2D area based on the 2D align flag. If both the requested area and the adjoining area are areas that allow overlapped allocation and they are both 2D areas, the embodiment allocates a used area overlapping with the adjoining area as a 2D area.

This can reduce the possibilities that access conflicts occur among the tasks 10 and that improperly formatted used areas are used, since areas that explicitly indicate that overlapped allocation is allowed and that they should be allocated as a 2D area are overlapped with each other in allocation.

In addition, the embodiment registers the start pointer to the allocated used area, and area management information including 2D align flag and overlap flag included in the area allocation request to the memory management table 400.

This enables the program for the tasks 10 to allocate a 2D area and an overlapping used area simply by providing the area allocation request including the 2D align flag indicating that the memory area should be allocated as a 2D area and the overlap flag indicating that overlapped allocation is allowed, therefore the program for the tasks 10 can be further simplified.

Moreover, the embodiment reads the overlap counter corresponding to an adjoining area and the overlap counter corresponding to an allocated used area from the memory management table 400, and compares them and increments the larger value. And it searches for a used area appropriate to the area freeing request as the area to be freed based on the memory management table 400, and reads the overlap flag corresponding to the area to be freed from the memory management table 400. Based on the overlap flag, it determines whether or not the area to be freed is an area that allows overlapped allocation, and if it is determined that the area is an area allowing overlapped allocation, it decrements the overlap counter corresponding to the area. When the value of the overlap counter reaches a predetermined value, the embodiment frees the area as an available memory area.

This enables overlapping and allocating used areas to be freed without effect on each another.

In the embodiment above, the two-dimensional memory 20 corresponds to the memory of Inventions 1, 2, and 8 to 10; the start pointer corresponds to the access information of Invention 1, 4, 7, 9, or 10; and the overlap flag corresponds to the overlap information of Inventions 1 to 4, 6, 7, 9, or 10. Also, the 2D align flag corresponds to the multidimensional align information of Inventions 5 to 7; the 2D area to the multidimensional space memory area of Invention 5 or 6; and steps S100 to S122, S130, and S134 to S152 correspond to the used area allocation section of Inventions 1 to 7, or 9, or the used area allocation step of Invention 10.

Also, in the embodiment, the steps S124 through S128, and S132 correspond to the area management information registration section of Inventions 1, 4, and 7 to 9, or the area management information registration step of Invention 10; step S108 corresponds to the second requested area determination section of Invention 6; and steps S110 and S136 correspond to the requested area determination section of Invention 3 or the first requested area determination section of Invention 6. Also, the steps S112, S134, S138, and S152 correspond to the candidate area searching section of Invention 2 or 3; step S118 to the second adjoining area determination section of Invention 6; and steps S120 and S146 correspond to the adjoining area determination section of Invention 2, 3, or 6.

Also, in the embodiment, steps S122 and S148 correspond to the overlapping used area allocation section of Invention 2, 3, 6, or 8; steps S130 and S150 correspond to the non-overlapping used area allocation section of Invention 3; and steps S200 to S208 correspond to the used area freeing section of Invention 8. Also, step S202 corresponds to the to-be-freed area searching section of Invention 8, and steps S204 to S208 correspond to the used area freeing section of Invention 8.

While the embodiment above uses the two-dimensional memory 20, the invention is not limited to this. Rather, any common type of memory (one-dimensional memory as opposed to two-dimensional memory) and other extended memory may be employed.

Also, while the embodiment above realizes the processes shown in the flow charts of FIGS. 9 and 10 by hardware and software, the invention is not thus limited: those processes can be realized only by hardware.

Also, while in the embodiment, the processes shown in the flowcharts of FIGS. 9 and 10 are performed by executing a control program that is stored in advance in a ROM, the invention is not limited to this. Rather, a program describing these procedures may be stored in a storage medium and loaded to RAM from the medium so as to perform the program.

Storage media may include semiconductor storage media such as RAM and ROM, magnetically storing storage media such as FD and HD, optically reading storage media such as CD, CDV, LD, and DVD, magnetically storing/optically reading storage media such as MO, and any other storage media that can be read by a computer, whether electronically, magnetically, or optically.

Also, while the embodiment above applies the memory management apparatus, program, and method of the invention to the case where the usage of the two-dimensional memory 20 is managed on the basis of the memory management table 400 as shown in FIG. 1, the invention is not thus limited. Rather, the invention may be applied to other cases without departing from the scope of the invention.

What is claimed is:

1. A memory management apparatus comprising:
   a used area allocation section; and
   an area management information registration section, the area management information registration section registering area management information including access information for a used area allocated by the used area allocation section to the memory management table, the used area allocation section allocating a necessary used area from available memory areas of memory areas on the basis of a memory management table for managing memory usage, the used area allocation section searching for an area among the used memory areas that allows overlapped allocation from the memory areas based on the memory management table, the used area allocation section allocating the necessary used area that overlaps with the used area that allows overlapped allocation, and the used area allocation section including a candidate area searching section, a adjoining area determination section, a requested area determination section, an overlapping used area allocation section, and a non-overlapping used area allocation section, the area management information including overlap information that indicates whether or not overlapped allocation of the memory area is allowed, the candidate area searching section, in response to an area allocation request, including area size information that indicates a necessary size of the used area and overlap information, the candidate area searching section searching for as a candidate area an area having a size that is determined by the area size information included in the area allocation request from among available memory areas of the memory areas on the basis of the memory management table, the adjoining area determination section reading, from the memory management table, the overlap information corresponding to an adjoining area that is in terms of address contiguous with the candidate area located by the candidate area searching section, the adjoining area determination section based on the overlap information, determining whether or not the adjoining area is an area that allows overlapped allocation, the overlapping used area allocation section, if the adjoining area determination section determines that the adjoining area allows overlapped allocation, allocating the used area that overlaps with the adjoining area, the requested area determination section determining whether or not a requested used area is an area that allows overlapped allocation on the basis of the overlap information included in the area allocation request, and the non-overlapping used area allocation section, if the requested area determination section determines that the requested area does not allow overlapped allocation, allocating the candidate area located by the candidate area searching section as the used area, if both of the requested area determination section and the adjoining area determination section determine that the areas allow overlapped allocation, the overlapping used area allocation section allocating the used area that overlaps with the adjoining area.

2. The memory management apparatus according to claim 1, the area management information registration section registering area management information including access information for the used area allocated by the used area allocation section and overlap information that is included in the allocation request to said memory management table.

3. The memory management apparatus according to claim 2 further comprising:
a used area freeing section;
a to-be-freed area searching section; and
an overlapping area freeing section, the memory management apparatus including the used area freeing section, the to-be-freed area searching section, and the overlapping area freeing section, the area management information including an overlap counter that indicates the number of overlaps among the memory areas;

the area management information registration section reading from the memory management table the overlap counter corresponding to the adjoining area and the overlap counter corresponding to the used area allocated by the overlapping used area allocation section, comparing the overlap counters, and incrementing the one having a larger value, the to-be-freed area searching section, in response to an area freeing request, searching for a used area that is appropriate to the area freeing request as an area to be freed from among used areas of the memory on the basis of the memory management table, and the overlapping area freeing section decrementing the overlap counter corresponding to the area to be freed that is located by the to-be-freed area searching section, and, when the value of the overlap counter reaches a predetermined value, freeing the to-be-freed area as an available memory area.

4. The memory management apparatus according to claim 1, the area allocation request including multidimensional align information that indicates whether or not the memory areas should be allocated as a virtual multidimensional space area, and the used area allocation section determining whether or not the requested used area is a virtual multidimensional space area on the basis of the multidimensional align information included in the area allocation request, and if the used area allocation section determines that the area is a virtual multidimensional space area, the used allocation section allocates the used area as a multidimensional space memory area that takes into consideration the maximum spatial size of the virtual multidimensional space, and if the used area allocation section determines that the area is not a virtual multidimensional space area, the used area allocation section allocates the used area as a regular area.

5. The memory management apparatus according to claim 4 further comprising:
a first requested area determination section;
a second requested area determination section; and
a second adjoining area determination section, the area management information including the multidimensional align information, the area allocation request includes the overlap information, the used area allocation section including the first requested area determination section, the second requested area determination section, and the second adjoining area determination section, the first requested area determination section determining whether or not the requested used area is an area that allows overlapped allocation on the basis of the overlap information included in the area allocation request, the second requested area determination section determining whether or not the requested used area is a virtual multidimensional space area on the basis of the multidimensional align information included in the area allocation request, the second adjoining area determination section reading the multidimensional align information corresponding to the adjoining area from the memory management table, and, based on the multidimensional align information, determining whether or not the adjoining area is a virtual multidimensional space area, and if both of the first requested area determination section and the adjoining area determination section determine that the requested used areas allow overlapped allocation and both of the second requested area determination section and the second adjoining area determination section determine that the requested used areas are virtual multidimensional space areas, the overlapping used area allocation section allocating the used area that overlaps with the adjoining area as the multidimensional space memory area.

6. The memory management apparatus according to claim 5, the area management information registration section registering to the memory management table area management information, the area management information including access information for the used area allocated by the used area allocation section as well as the multidimensional align information and overlap information included in the area allocation request.

7. The memory management apparatus according to claim 6 further comprising:

a used area freeing section;

a to-be-freed area searching section; and an overlapping area freeing section, the memory management apparatus including the used area freeing section, the to-be-freed area searching section, and the overlapping area freeing section, the area management information including an overlap counter that indicates the number of overlaps among the memory areas, the area management information registration section reading from the memory management table the overlap counter corresponding to the adjoining area and the overlap counter corresponding to the used area allocated by the overlapping used area allocation section, comparing the overlap counters, and incrementing the one having a larger value, the to-be-freed area searching section, in response to an area freeing request, searching for a used area that is appropriate to the area freeing request as an area to be freed from among used areas of the memory on the basis of the memory management table, and the overlapping area freeing section decrementing the overlap counter corresponding to the area to be freed that is located by the to-be-freed area searching section, and, when the value of the overlap counter reaches a predetermined value, freeing the to-be-freed area as an available memory area.

8. The memory management apparatus according to claim 4 further comprising:

a used area freeing section;

a to-be-freed area searching section; and an overlapping area freeing section, the memory management apparatus including the used area freeing section, the to-be-freed area searching section, and the overlapping area freeing section, the area management information including an overlap counter that indicates the number of overlaps among the memory areas, the area management information registration section reading from the memory management table the overlap counter corresponding to the adjoining area and the overlap counter corresponding to the used area allocated by the overlapping used area allocation section, comparing the overlap counters, and incrementing the one having a larger value, the to-be-freed area searching section, in response to an area freeing request, searching for a used area that is appropriate to the area freeing request as an area to be freed from among used areas of the memory on the basis of the memory management table, and the overlapping area freeing section decrementing the overlap counter corresponding to the area to be freed that is located by the to-be-freed area searching section, and, when the value of the overlap counter reaches a predetermined value, freeing the to-be-freed area as an available memory area.

9. The memory management apparatus according to claim 5 further comprising:

a used area freeing section;

a to-be-freed area searching section; and an overlapping area freeing section, the memory management apparatus including the used area freeing section, the to-be-freed area searching section, and the overlapping area freeing section, the area management information including an overlap counter that indicates the number of overlaps among the memory areas, the area management information registration section reading from the memory management table the overlap counter corresponding to the adjoining area and the overlap counter corresponding to the used area allocated by the overlapping used area allocation section, comparing the overlap counters, and incrementing the one having a larger value, the to-be-freed area searching section, in response to an area freeing request, searching for a used area that is appropriate to the area freeing request as an area to be freed from among used areas of the memory on the basis of the memory management table, and the overlapping area freeing section decrementing the overlap counter corresponding to the area to be freed that is located by the to-be-freed area searching section, and, when the value of the overlap counter reaches a predetermined value, freeing the to-be-freed area as an available memory area.

10. The memory management apparatus according to claim 1 further comprising:

a used area freeing section;

a to-be-freed area searching section; and an overlapping area freeing section, the memory management apparatus including the used area freeing section, the to-be-freed area searching section, and the overlapping area freeing section, the area management information including an overlap counter that indicates the number of overlaps among the memory areas, the area management information registration section reading from the memory management table the overlap counter corresponding to the adjoining area and the overlap counter corresponding to the used area allocated by the overlapping used area allocation section, comparing the overlap counters, and incrementing the one having a larger value, the to-be-freed area searching section, in response to an area freeing request, searching for a used area that is appropriate to the area freeing request as an area to be freed from among used areas of the memory areas on the basis of the memory management table, and the overlapping area freeing section decrementing the overlap counter corresponding to the area to be freed that is located by the to-be-freed area searching section, and, when the value of the overlap counter reaches a predetermined value, freeing the to-be-freed area as an available memory area.

11. The memory management apparatus according to claim 1 further comprising:
 a used area freeing section;
 a to-be-freed area searching section; and
 an overlapping area freeing section,
 the memory management apparatus including the used area freeing section, the to-be-freed area searching section, and the overlapping area freeing section;
 the area management information including an overlap counter that indicates the number of overlaps among the memory areas,
 the area management information registration section reading from the memory management table the overlap counter corresponding to the adjoining area and the overlap counter corresponding to the used area allocated by the overlapping used area allocation section, comparing the overlap counters, and incrementing the one having a larger value,
 the to-be-freed area searching section, in response to an area freeing request, searching for a used area that is appropriate to the area freeing request as an area to be freed from among used areas of the memory areas on the basis of the memory management table, and
 the overlapping area freeing section decrementing the overlap counter corresponding to the area to be freed that is located by the to-be-freed area searching section, and, when the value of the overlap counter reaches a predetermined value, freeing the to-be-freed area as an available memory area.

12. A memory management program causing a computer to execute processes that are realized as:
 a used area allocation section; and
 an area management information registration section,
 the used area allocation section allocating a necessary used area from among available memory areas of memory areas on the basis of a memory management table managing memory usage and area management information registration section registering to the memory management table area management information including access information for the used area allocated by the used area allocation section, the used area allocation section searching for an area among the used memory area that allows overlapped allocation from the memory areas on the basis of the memory management table, the used area allocation section allocating the necessary used area that overlaps with the used area that allows overlapped allocation, and the used area allocation section comprising a candidate area searching section, an adjoining area determination section, a requested area determination section, an overlapping used area allocation section, and a non-overlapping used area allocation section,
 the area management information including overlap information that indicates whether or not overlapped allocation of the memory areas is allowed,
 the candidate area searching section, in response to an area allocation request, including area size information that indicates a necessary size of the used area, the candidate area searching section searching for as a candidate area an area having a size that is determined by the area size information included in the area allocation request from among available memory areas of the memory areas on the basis of the memory management table,
 the adjoining area determination section reading, from the memory management table, overlap information corresponding to an adjoining area that is in terms of address contiguous with the candidate area located by the candidate area searching section, the adjoining area determination section based on the overlap information, determining whether or not the adjoining area is an area that allows overlapped allocation,
 the overlapping used area allocation section, if the adjoining area determination section determines that the adjoining area allows overlapped allocation, allocating the used area that overlaps with the adjoining area,
 the area allocation request including the overlap information,
 the requested area determination section determining whether or not a requested used area is an area that allows overlapped allocation on the basis of the overlap information included in the area allocation request,
 the non-overlapping used area allocation section, if the requested area determination section determines that the requested area does not allow overlapped allocation, allocating the candidate area located by the candidate area searching section as the used area, and
 if both of the requested area determination section and the adjoining area determination section determine that the requested used areas allow overlapped allocation, the overlapping used area allocation section allocating the used area that overlaps with the adjoining area.

13. A memory management method comprising the steps of:
 a used area allocation step; and
 an area management information registration step,
 the used area allocation step including a candidate area searching step, a adjoining area determination step, a requested area determination step, an overlapping used area allocation step, and a non-overlapping used area allocation step,
 the used area allocation step allocating a necessary used area from available memory areas of memory areas on the basis of a memory management table managing memory usage,
 the area management information registration step registering to the memory management table area management information including access information for the used area allocated at the used area allocation step,
 the area management information including overlap information that indicates whether or not overlapped allocation of the memory areas is allowed,
 the used area allocation step searching for a used area that allows overlapped allocation from among the memory areas based on the memory management table, and the used area allocation step allocating the used area that overlaps with the located used area that allows overlapped allocation,
 the candidate area searching step, in response to an area allocation request, including area size information and overlap information that indicates a necessary size of the used area, the candidate area searching step searching for as a candidate area an area having a size that is determined by the area size information included in the area allocation request from among available memory areas of the memory on the basis of the memory management table,
 the adjoining area determination step reading, from the memory management table, overlap information corresponding to an adjoining area that is in terms of address contiguous with the candidate area located by the candidate area searching step, the adjoining area determination step based on the overlap information, determining whether or not the adjoining area is an area that allows overlapped allocation, the overlapping used area allocation step, if the adjoining area determination step determines that the adjoining area allows overlapped allocation, allocating the used area that overlaps with the adjoining area, the requested area determination step determining whether or not a requested used area is an area that allows overlapped allocation on the basis of the overlap information included in the area allocation request, the non-overlapping used area allocation step, if the requested area determination step determines that the requested area does not allow overlapped allocation, allocating the candidate area located by the candidate area searching step as the used area, and if both of the requested area determination step and the adjoining area determination step determine that the requested used areas allow overlapped allocation, the overlapping used area allocation step allocating the used area that overlaps with the adjoining area.

* * * * *